March 8, 1955     T. G. CUNNING     2,703,760
METHOD OF COATING FRUITS AND VEGETABLES
Filed Jan. 25, 1952     2 Sheets-Sheet 1
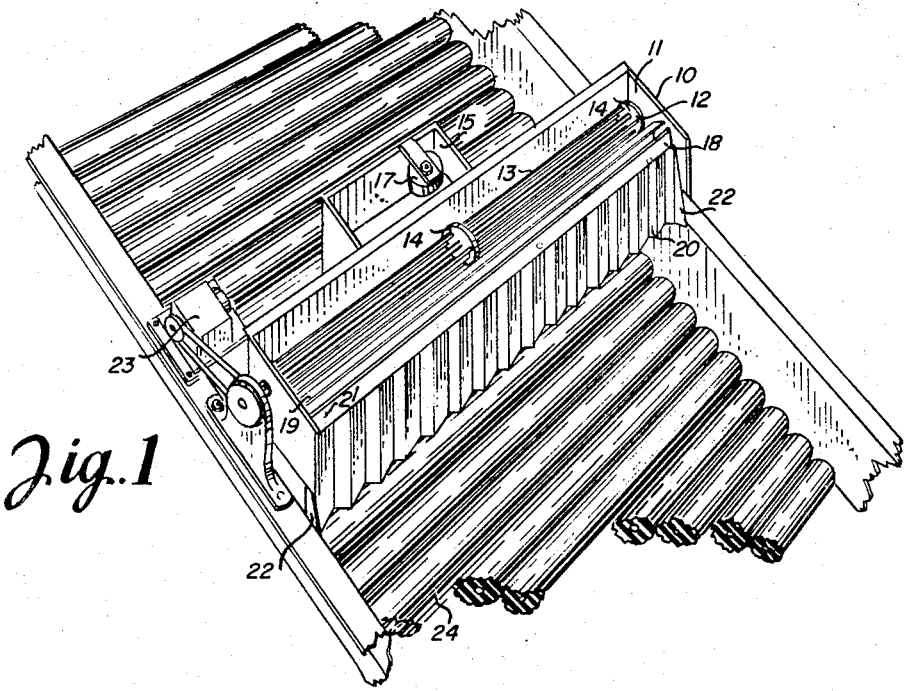
Fig. 1
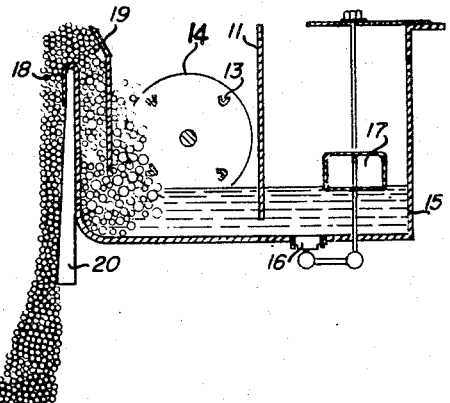
Fig. 3
INVENTOR
T. GEORGE CUNNING
ATTORNEY

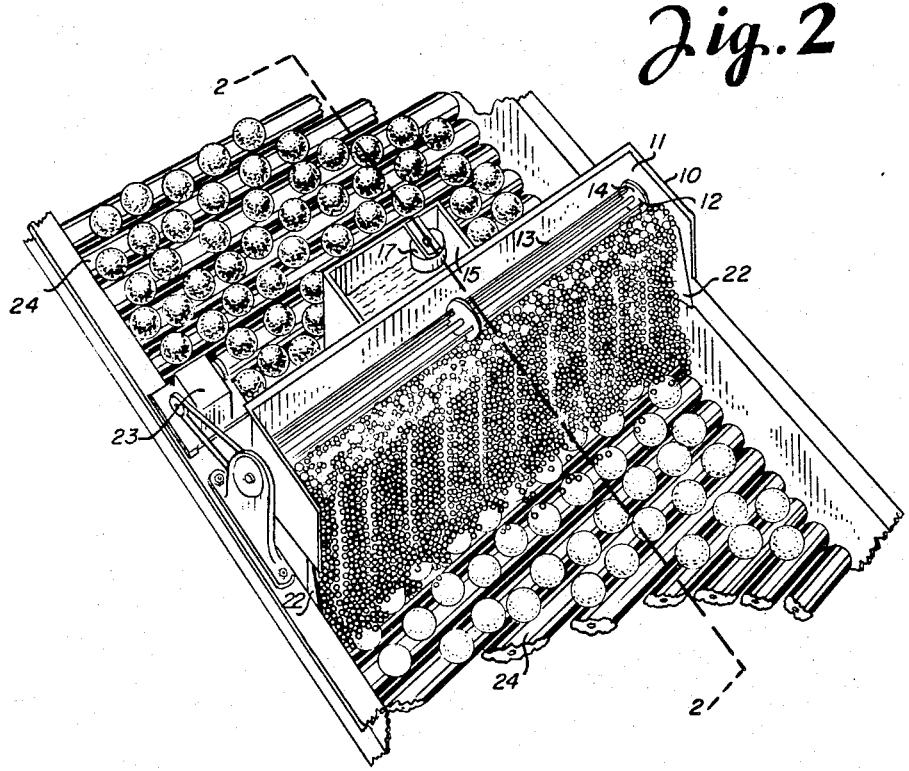

United States Patent Office 2,703,760
Patented Mar. 8, 1955

2,703,760

METHOD OF COATING FRUITS AND VEGETABLES

Thomas George Cunning, Ontario, Calif., assignor to S. C. Johnson & Son, Inc., Racine, Wis.

Application January 25, 1952, Serial No. 268,316

2 Claims. (Cl. 99—168)

This invention relates to a method of providing a protective wax film and apparatus therefor. More particularly, it relates to an improved method of foaming an aqueous wax emulsion, delivering and depositing it in a uniform continuous consistent curtain of foam, and an apparatus for effecting such method.

Until recent years, aqueous wax emulsions were applied to surfaces, for example to fruits and vegetables, to form wax coatings thereon by either the dip or spray method. Kenneth R. Recker, in U. S. Patent No. 2,430,187, disclosed a method and apparatus whereby a wax emulsion was applied to fruit and vegetables in the form of foam. According to this method the wax emulsion was agitated by mechanical means or by aeration in an agitation tank until a foam was generated and the foam was discharged from the agitation tank and distributed along an angular-toothed bottom edge of the neck portion of the tank.

While in principle this method of applying wax to fruit and vegetables is excellent, the generating foam was unreliable, the direction of the foam was hard to control and the concentration of the foam varied.

Joseph F. P. Newhall and Maynard C. Barker, in U. S. Patent No. 2,488,876, disclosed a mechanical foaming apparatus especially adapted for use with the foaming method of wax coating fruit and vegetables that was intended to provide a uniform foam, the concentration and direction of which could be easily controlled. Basically, the Newhall et al. foaming apparatus comprises an agitator tank, agitating means, a discharge lip, and a baffle positioned between the discharge lip and the agitating means. The agitating means preferably comprises an agitator spool which has a plurality of agitator blades affixed thereto. In addition, a surge tank is positioned at the rear of the agitator tank, and contains a float-controlled check valve to regulate the level of the coating composition to be foamed.

This foaming apparatus which has had wide commercial acceptance is excellent to generate a uniform foam, but as the foam, being created either mechanically or by aeration, is emitted from the foam-forming vessel and drops down upon the produce passing thereunder, it tends to fall in conglomerates, missing the majority of the produce. Operators of the produce-treating apparatus, in unsuccessful efforts to contact all the produce, have used much more of the coating material than is necessary.

I have therefore developed a new and novel method for applying an aqueous wax emulsion foam to fruits and vegetables wherein uniform contact of all the produce to be treated with the foamed emulsion is insured. Furthermore, the practice of my novel method substantially reduces the use of the treating material.

My invention therefore, broadly stated, is a method of providing articles with a protective wax film, comprising agitating a liquid aqueous wax emulsion to convert the liquid to a foamy mass, then directing the mass downwardly and aligning or transforming the foamy mass into a continuous uniform curtain of foam, extending said curtain of foam perpendicular to the plane in which the articles to be treated lie. The articles are then passed through the lower portion of the foam curtain.

In addition, I have developed a foaming and foam-distributing apparatus particularly adapted for carrying out this method. The apparatus comprises an agitating tank, with agitating means positioned therein. The top edge of one of the sides of the agitating tank serves as an overflow lip. A corrugated delivery guide extends downward from the overflow lip to a plane beyond the bottom of the tank, the guide consisting of a series of alternate ridges and channels, uniform in dimension.

The invention will be understood by reference to the following directions taken in connection with the accompanying drawings, in which is shown a foaming and foam-distributing apparatus particularly adapted for carrying out the method of this invention. While I have developed the apparatus illustrated herewith for carrying out my novel method, it is to be understood that the method may be carried out in any suitable apparatus, provided it affords means for creating a foam and then emitting it, and further provides at the point of such emission for a vertically-disposed corrugated guide, having a series of uniform alternate ridges and channels.

The reference numerals have been used for the designation of like parts throughout and in the drawings.

Fig. 1 is a perspective view of the apparatus and a portion of the produce conveyor line.

Fig. 2 is a perspective view of the apparatus and a portion of the produce conveyor line, showing the contact of the lower portion of the foam curtain and the produce which is moving upon the conveyor.

Fig. 3 is a side elevational sectional view taken along line 2—2 of Fig. 2.

Referring more specifically to the drawing, the foamer 10 is made up of an agitating tank 11, in which is rotatably positioned an agitator spool 12. The spool carries a plurality of beater arms 13, as mounted by means of brackets 14. The beater arms 13 are preferably constructed in the shape of a V and are so positioned on the spool 12 that the open Vs' of the arms strike the fluid as the spool 12 is being rotated.

At the rear of the agitator tank 11 is positioned a surge tank 15 having a fluid inlet 16 and a float control check valve 17 which maintains the level of fluid in the surge tank 15 at a predetermined level. As seen in Fig. 3, the bottom of the surge tank 15 is in communication with the agitator tank 11 to allow free flow of emulsion from the surge tank 15 as it is needed in the agitator tank 11.

The front side of the agitator tank is bent over to form a continuous smooth overflow lip 18. To aid in controlling the direction of the foam, a baffle 19 is positioned between the agitator spool 12 and the discharge lip 18. Extending downwardly from the overflow lip to a point substantially lower than the bottom of the agitator tank 11 is a corrugated guide 20. This guide is composed of a series of uniform ridges and channels extending entirely across the front side of the agitator tank 11. The corrugated guide may be inserted under the overflow lip 18, and thereupon held secure by means such as rivets 21. Two triangular plates 22 with their leading edges being diagonally arranged, are margined to opposite ends of the guide 20.

The agitator spool 12 is rotated by means of a motor as shown at 23.

In operation, as seen in Figs. 2 and 3, it will be seen that an aqueous wax emulsion enters the surge tank 15 through the fluid inlet 16. The agitator spool 12 is rotated at the desired speed, causing the V-shaped arms 13 to beat the wax emulsion flowing into the agitator tank 11. This action causes air to integrate throughout the emulsion, resulting in a foaming of the liquid. The clockwise rotation directs the bubbles against and under the baffle 19 and up and over the overflow lip 18. The foam disperses consistently, following the uniform ridges and channels of the corrugated guide 20. The vertically extended ridges and channels effect a transforming or aligning action on the foam and orients the foam to cause it to continue downwardly in a uniform blanket or curtain. The corrugated guide, extending to a point substantially below the agitator tank 11, does not allow conglomeration or "breaking off" of the foam, but continues to carry it to a point where its texture and consistency is so well developed that it extends independently to the conveyor system 24 without additional mechanical aid (see Fig. 3).

The articles to be treated, shown in the form of oranges in the drawing, progresses along the conveyor causeway and moves through the contacting or lower portion of this hanging curtain of foam.

Many apparently widely different embodiments of this invention may be made without departing from the principle, breadth and spirit thereof, and it is to be understood, therefore, that this invention is not limited to the specific embodiments thereof, except as encompassed by the following claims:

I claim:

1. A method of providing comestibles with a protective wax film, comprising agitating a liquid aqueous wax emulsion to convert said liquid to a foamy mass, directing said mass downwardly, aligning said mass into a continuous uninterrupted uniform curtain of foam, extending said curtain of foam perpendicular to the plane in which the articles to be treated lie and passing said articles through the lower portion of said foam curtain whereby a uniform coating is produced on said comestibles.

2. A method of providing fruits and vegetables with a protective wax film, comprising agitating a liquid aqueous wax emulsion to convert said liquid to a foamy mass, moving said mass downwardly through a parallel plurality of substantially vertically-disposed channels, causing the foamy mass to extend downwardly in a continuous uninterrupted uniform curtain of foam, perpendicular to the plane in which said fruits and vegetables to be treated move, and moving said fruits and vegetables through the lower portion of said foam curtain whereby a uniform coating is produced on said fruits and vegetables.

References Cited in the file of this patent

UNITED STATES PATENTS

| Number | Name | Date |
|---|---|---|
| 299,370 | Fletcher et al. | May 27, 1884 |
| 930,926 | Bentley | Aug. 10, 1909 |
| 1,021,775 | Hauswirth | Apr. 2, 1912 |
| 1,059,976 | Carrier | Apr. 29, 1913 |
| 2,128,028 | Hampton | Aug. 23, 1938 |
| 2,488,876 | Newhall et al. | Nov. 22, 1949 |
| 2,560,820 | Recker | July 17, 1951 |
| 2,596,672 | Gard et al. | May 13, 1952 |